(12) United States Patent
Ning

(10) Patent No.: US 6,836,382 B2
(45) Date of Patent: Dec. 28, 2004

(54) IMAGING MODULE

(76) Inventor: Alex Ning, 2122 Sea Island Pl., San Marcos, CA (US) 92069

( * ) Notice: Subject to any disclaimer, the term of this patent is extended or adjusted under 35 U.S.C. 154(b) by 94 days.

(21) Appl. No.: 10/434,995

(22) Filed: May 9, 2003

(65) Prior Publication Data

US 2004/0223235 A1 Nov. 11, 2004

(51) Int. Cl.[7] .......................... G02B 9/04; G02B 13/18; G02B 13/16
(52) U.S. Cl. ....................... 359/793; 359/717; 359/795; 348/335
(58) Field of Search ................................ 359/717, 793, 359/795; 348/335, 340

(56) References Cited

U.S. PATENT DOCUMENTS 5,166,830 A * 11/1992 Ishibai et al. ............... 359/717
5,600,493 A * 2/1997 Katsuma ..................... 359/717
2003/0169362 A1 * 9/2003 Saito ........................... 348/335

* cited by examiner

Primary Examiner—Georgia Epps
Assistant Examiner—Jack Dinh
(74) Attorney, Agent, or Firm—James F. Kirk

(57) ABSTRACT

A imaging module has an electronic imager and an objective lens system. The electronic imager has an active area that is typically rectangular is shape. An image is formed on the active area with a maximum effective image dimension DI. An objective lens system forms an image of a distant object on the image plane. The objective lens system has a focal length f0 and a height TT. A first lens element has a convex first surface that faces the object and a second surface. The first lens element has a positive power. A second lens element has a concave first surface facing the first lens second surface and an aspherical second surface facing the image plane. The first and second lens elements are shaped and spaced to obtain a ratio of f1/f0 from 0.5 to 2.0, and ratio of TT/DI<1.5.

13 Claims, 1 Drawing Sheet

IMAGING MODULE

FIELD OF THE INVENTION

This invention relates to objective lenses for use with digital cameras employing charged coupled devices (CCDs) or similar light sensitive electronic components. Objective lenses for such applications are described in various references, such as Rose et al., "Physical Limits to the Performance of Imaging Objective lens," Physics Today, September 1989, pages 24–32 and the references cited therein; and in Sequin et al., "Charge Transfer Devices," Advances in Electronics and Electron Physics, suppl. 8, L. Marton editor, Academic Press, New York, 1975, the relevant portions of all of which are incorporated herein by reference.

BACKGROUND OF THE INVENTION

Digital cameras use objective lenses to form images on the electronic imaging sensors such as CCD or CMOS imagers. For hand-held devices such as a cellphone, it is required that the digital camera imaging module be small. This requires that the objective lens have very compact size or height or low-profile.

Low profile objective lenses have relatively small lens elements which if they are too small, can be difficult to handle and assemble into a finished unit. Low cost is an important consideration for lenses for electronic imaging, especially where the objective lens is to be part of a mass marketed product. In addition, the electronic imagers used with such devices are improving in terms of image quality. The use of small high quality lenses increases the cost of assembly. The present invention is believed to provide a means of achieving a high level of optical performance with a minimum number of lens elements, thereby keeping the cost down, and a lens height suitable for use in electronic cameras and cell phones.

U.S. Pat. No. 6,097,551 to Kreitzer describes an objective lens design with two elements. The first element is specifically characterized as having a negative optical power while the second element is described as having a positive optical power. The arrangement of lenses in the design of the '551' patent to Kreitzer tend to produce an objective lens design with a high profile making the arrangement of the '551' patent unsuitable for compact cameras.

U.S. Pat. No. 6,449,105 to Dou describes an objective lens with two elements. However, as in the case of the '551' patent, the design of the '105' patent also requires that the first element have a negative optical power. The arrangement of the lens elements shown in the design of the '105' patent, therefore also tend to form an objective lens that has a high profile thereby making the design of the '105' patent unsuitable for compact cameras.

In U.S. Pat. No. 6,441,971, the same inventor describes a three-element objective lens. The first element is shown as a positive meniscus. The three element lens of the '971' patent has a higher profile than the present invention and because of its increased component count, it is more costly to manufacture.

SUMMARY OF THE INVENTION

It is therefore an object of the present invention to provide an objective lens for electronic imaging which:
1. uses only two lens elements to minimize costs;
2. has a very short height for a given imager size; and
3. has a level of optical performance compatible with that of modern imagers.

To achieve these objects and other objects, the invention provides a two element objective lens wherein a first lens element 20, located on the object side of the objective lens has a positive optical power and is shaped as a meniscus element. The first lens element has a convex surface that faces the object. A second lens element 28, is located on the image side of the objective lens. The second lens element has a first lens surface facing the second surface of the first lens. The second surface of the second lens faces an image plane. The second surface of the second lens is aspheric.

PREFERRED EMBODIMENT

Figure 1:
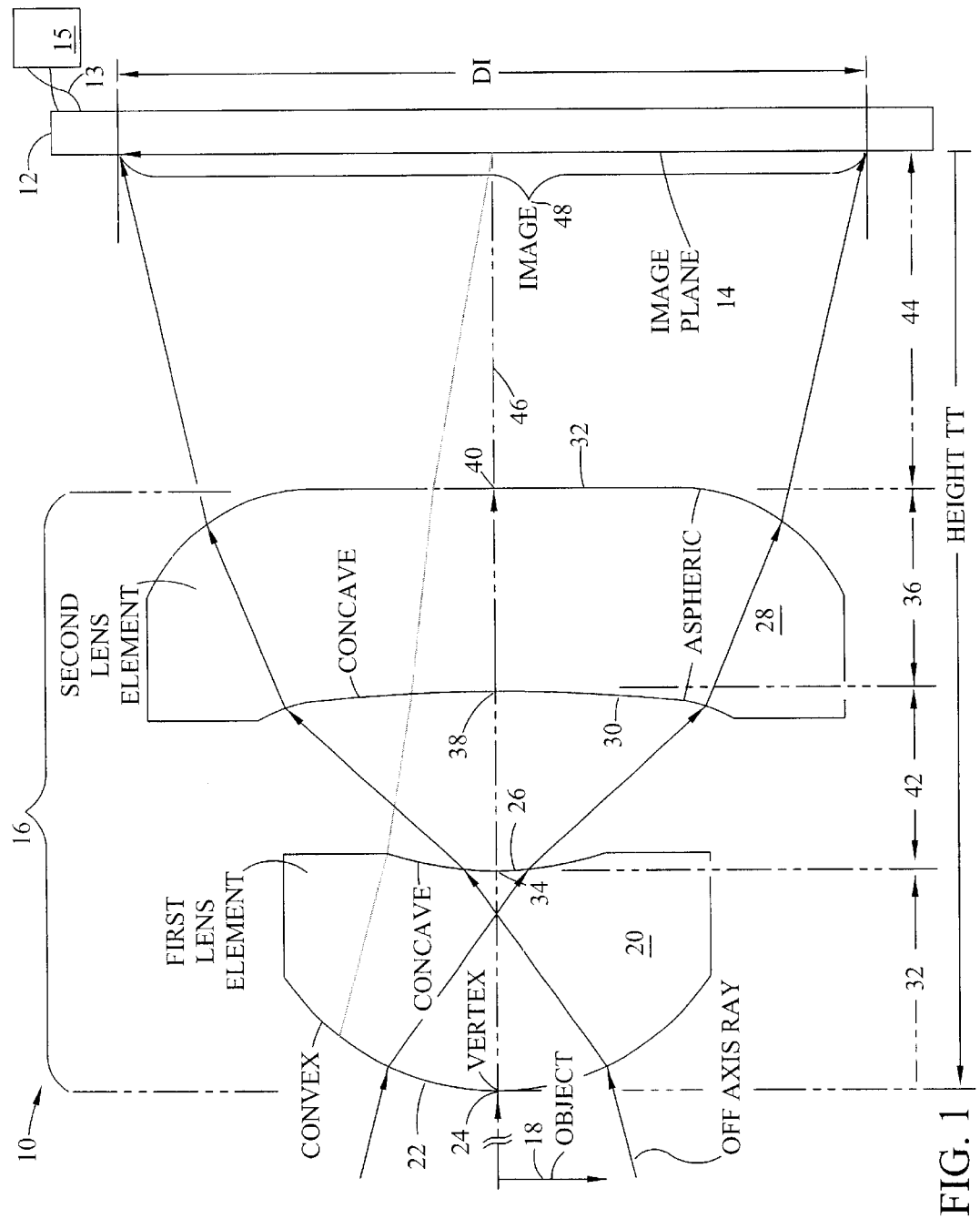
FIGS. 1 is a schematic side views of the sequence of lens elements of the present invention.

FIG. 1 illustrates the invention digital imaging module 10. An electronic imager 12 is shown schematically in section as a vertical rectangle at the right having an image plane 14 on its left surface. The electronic imager 12 has an active region that is typically rectangular in shape. The diagonal dimension DI of the rectangular active region is shown on FIG. 1, where it characterizes a measure of the maximum effective image. Signal leads 13 schematically represent the cabling necessary to carry CCD image signals, control levels and power to the camera electronics and processor represented by block 15.

The elements shown schematically in cross section under bracket 16 represent an objective lens system for forming an image of an object represented by inverted arrow 18 on the image plane 14. The objective lens system under bracket 16 has a focal length f0. The lens element at the left is a first lens element 20. The first lens element 20 has a first lens surface 22. First surface 22 has a first lens surface vertex 24. The first lens element 20 has a focal length f1.

The height of the objective lens system is shown as distance TT. The height of the objective lens system is measured from the first lens element first vertex 24 to the image plane 14. The first lens element first surface 22 is a convex surface facing the object 18. The first lens element has a second surface 26 shown in the example of FIG. 1 as a concave surface. The first lens element 20 is designed to have a positive power.

A second lens element 28 has a first surface 30 facing the first lens second surface 26. The second lens element 28 also has a second surface 32 facing the image plane 14. The second surface 32 is an aspheric surface.

In the preferred embodiment of the imaging module, the first and second lens elements 20, 28 are shaped and spaced to obtain a ratio of f1/f0 to be in a range extending from 0.5 to 2.0 and the first and second lenses 20, 28 are shaped and spaced to obtain a ratio of TT/DI that is less than 1.5.

The first lens has a first lens thickness 32 and the second lens element 28 has a second lens thickness 36. The first lens element thickness 32 is measured from the first lens element first surface vertex 24 to the first lens element second surface vertex 34. The second lens element thickness 36 is measured from the second lens element first surface vertex 38 to the second lens element second surface vertex 40. The first to second lens element gap 42 is the distance between the first lens element second surface vertex 34 and second lens element first surface vertex 38. The second lens element space gap 44 is the distance between the second lens element second surface vertex 40 and the image plane 14.

The second lens element 28 of the present invention is an aspherical element (meaning, at least one of the two surfaces is aspherical). The second surface 32 facing the image must be aspherical, as described as follows below. The second surface 32 is generally of a convex shape.

The terms "spherical", "conic", and "general asphere" are used herein and in the claims in accordance with their conventional meanings in terms of a lens surface equation such as the following Equation. 1:

$$z = \frac{cy^2}{1+[1-(1+k)c^2y^2]^{1/2}} + Dy^4 + Ey^6 + Fy^8 + Gy^{10} + Hy^{12} + Iy^{14} \qquad \text{Eq. 1}$$

where z is the surface sag or displacement at a distance or radius "y" from the optical axis 46 of the objective lens. The coefficient "c" is the curvature of the lens at the optical axis and it is equal to the reciprocal of the radius. The coefficient "k" is a conic constant. A surface is spherical if "k" and "D" through "I" are all zero. A surface is an aspherical surface if either "k" or any of the coefficients "D" through "I" are non-zero.

The first lens element of the present invention can be made of any suitable optical materials including both glass and plastic materials. Either or both surfaces can be made spherical or aspherical using suitable optical manufacturing techniques such as polishing and plastic or glass molding.

Because of the aspherical profile of the second lens element, and in particular, the aspheric second surface 32 that faces the image plane, the second lens element 28 must be made with a manufacturing technique that is suitable for producing aspheric surfaces. If the material is plastic, precision molding can be used. If the material is glass, a glass molding process must be employed. The second lens element 28 provides most of the aberration correction of the objective. The use of plastic material has a minimal impact on the focusing stability of the objective lens even though the plastic material is more sensitive to the environmental conditions.

The objective lens 16 of the present invention has a very short lens height relative to the size of the image that it provides. An electronic camera using an objective lens such as objective lens 16 would form an image on the active surface of the solid-state imager 12. The IMAGE bracket 48 on the image plane schematically identifies the limits of the active surface and therefore, the limits of image plane 14. As stated above, the electronic imager 12 is typically a CCD or CMOS imager. As explained above, the effective imaging area of the electronic imager 12 is a rectangular area with a diagonal size of DI. In order to achieve acceptable image quality, the lens must provide an image area with a diameter equal or greater than DI. The lens height or total track (TT) shown at the base of FIG. 1 is defined as the distance from the first lens surface vertex 24 to the image plane 14. The "compactness" of the objective lens system under bracket 16 is defined as the ratio of TT to DI. For prior art lens designs, this ratio is greater than 1.5. However, the objective lens of the present invention obtains an improvement in this ration such that the ration of TT/DI<5.

With the ration of TT/DI<1.5, the objective lens is considered a low profile objective lens system making it suitable for compact digital camera modules such as those used in cell phones. Using the lens element arrangement of the present invention in combination with suitable selection of the material and the surface prescription for each element, excellent imaging quality is obtained as demonstrated with an objective lens system formed by use of the prescriptions of Table 1 and Table 2 below.

Each row in Table 1 characterizes the properties of one of the four surfaces 22, 26, 30 and 32. Referring now to FIG. 1 and to the first row for surface 22, the radius of the first lens first surface 22 is given as "1.398597 millimeters. The thickness of the first lens 20 from its first vertex 24 to its second vertex 34 is 1.059255 millimeters and is shown in FIG. 1 as dimension 32. The material is PMMA, a plastic. The diameter of the curved surface is 2.562526 millimeters.

Referring now to the second row of Table 2, the radius of the first lens second surface 26 is 2.943854 millimeters. The number, 1.646231 millimeters, is the distance between the first lens second surface 26 and the second lens first surface 30 and is shown as dimension 42. No entry appears in the material column. The next number, 1.841075 millimeters, is the diameter of first lens element second surface.

Referring to the third row, the radius for the second lens clement first surface 30, appears as −20.93455 millimeters. The thickness of the second lens element 28 from its first vertex 38 to its second vertex 40 is 1.271106 millimeters and is shown as dimension 36. The material is again PMMA for plastic. The diameter of the second lens first surface is 2.59179 millimeters.

The fourth row begins with the radius of the second lens element second surface as being infinite. The second lens element second surface 32 is therefore substantially flat. The distance from the second lens element second surface to the image plane 14 is 0.8860055 millimeters and is shown as dimension 44. The maximum diameter of the image circle on the second lens element second surface 32 is 3.826461 millimeters.

The fifth and last row characterizes the image plane as having an infinite radius. The diameter of the image circle on the image plane and therefore the value of DI is 4.958425 millimeters.

TABLE 1

| Surf | Radius | Thickness | Glass | Diameter | Conic |
|---|---|---|---|---|---|
| OBJ | Infinity | Infinity | | 0 | 0 |
| 22 | 1.398597 | 1.059255 | PMMA | 2.562526 | 0 |
| 26 | 2.943854 | 1.646231 | | 1.841075 | 0 |
| 30 | −20.93455 | 1.271106 | PMMA | 2.59179 | 0 |
| 32 | Infinity | 0.8860055 | | 3.826461 | 0 |
| IMA | Infinity | | | 4.958425 | 0 |

Each of the four lens surfaces in the present example are also modified aspheric surfaces. Each surface, 22, 26, 30 and 32 is defined by a respective lens equation in the form of Eq. 1 above. By way of example, referring to the second row, in Table 2 below, the number "−0.10748001" is the "E" coefficient for the first lens second surface 26 as shown in FIG. 1.

TABLE 2

ASPHERICAL COEFFICIENTS:

| Surface 22: | D: −0.0045744201 | E: 0.030812954 | F −0.014458329 |
|---|---|---|---|
| Surface 26: | D: 0.12949644 | E −0.10748001 | F 0.19175913 |
| Surface 30: | D: −0.074101916 | E 0.031033494 | F −0.048679929 |
| Surface 32: | D: −0.0078282645 | E −0.01093038 | F −0.0020568155 |

In the preferred embodiment, Table 1 characterizes the spherical properties of the respective lenses. Table 2 provides a further or composite level of refinement to the prescription for each of the respective spherical surfaces defined by Table 1. By application of the changes in Table 2, the otherwise spherical surface of the objective lens system first lens first surface 22 is amended to be aspherical in shape. The first lens second surface 36 is amended to be aspherical in shape in shape. The second lens first surface 30 is amended to be aspherical in shape. The second lens second surface 32 is a substantially flat surface which is amended to be an aspherical shape.

Those skilled in the art will appreciate that various adaptations and modifications of the preferred embodiments can he configured without departing from the scope and spirit of the invention. Therefore, it is to be understood that the invention may be practiced other than as specifically described herein, within the scope of the appended claims.

TABLE 1

| Surf | Radius | Thickness | Glass | Diameter | Conic |
|---|---|---|---|---|---|
| OBJ | Infinity | Infinity | | 0 | 0 |
| 22 | 1.398597 | 1.059255 | PMMA | 2.562526 | 0 |
| 26 | 2.943854 | 1.646231 | | 1.841075 | 0 |
| 30 | −20.93455 | 1.271106 | PMMA | 2.59179 | 0 |
| 32 | Infinity | 0.8860055 | | 3.826461 | 0 |
| IMA | Infinity | | | 4.958425 | 0 |

TABLE 2

| | | | |
|---|---|---|---|
| Surface 22: | D: −0.0045744201 | E: 0.030812954 | F −0.014458329 |
| Surface 26: | D: 0.12949644 | E −0.10748001 | F 0.19175913 |
| Surface 30: | D: −0.074101916 | E 0.031033494 | F −0.048679929 |
| Surface 32: | D: −0.0078282645 | E −0.01093038 | F −0.0020568155 |

What is claimed is:

1. An imaging module for forming an image of an object on an image plane, said imaging module comprising:
    an electronic imager, said electronic imager having an active surface, the image plane being formed on the active surface with maximum effective dimension DI,
    an objective lens system having a focal length f0,
        a first lens element having a first surface facing the object and a second surface, the first lens element having a positive power and a focal length f1,
        a second lens element having a first surface facing the first lens element second surface, a second aspherical surface facing the image plane,
        the objective lens system having and a height TT, the first and second lens elements being shaped and spaced from suitable optical materials and formed to obtain the ratio of f1/f0 to be in the range of 0.5 to 2.0 to form the image of the object on the image plane.

2. The imaging module of claim 1 wherein the first lens element first surface is convex in shape.

3. The imaging module of claim 1 wherein the first lens element second surface is concave in shape.

4. The imaging module of claim 1 wherein the second lens element first surface is concave in shape.

5. An imaging module for forming an image of an object on an image plane, said imaging module comprising:
    an electronic imager, said electronic imager having an active surface, the image plane being formed on the active surface with maximum effective dimension DI,
    an objective lens system having a focal length f0,
        a first lens element having a first surface facing the object and a second surface,
        the first lens element having a positive power and a focal length f1,
        a second lens element having a first surface facing the first lens element second surface, and a second aspherical surface facing the image plane,
        the objective lens system having and a height TT, the first and second lens elements being shaped and spaced from suitable optical materials and formed to obtain the ratio of f1/f0 to be in the range of 0.5 to 2.0 and to obtain a ratio of TT/DI that is less than 1.5 to form the image of the object on the image plane.

6. The imaging module of claim 5 wherein the first lens element first surface is convex in shape.

7. The imaging module of claim 5 wherein the first lens element second surface is concave in shape.

8. The imaging module of claim 5 wherein the second lens element first surface is concave in shape.

9. The imaging module of claim 5 wherein the first lens element first surface is convex in shape and the first lens element second surface is concave in shape.

10. The imaging module of claim 5 wherein the second lens element first surface is concave in shape and wherein the second lens element second surface is convex in shape.

11. The imaging module of claim 5 wherein the first lens element first surface is convex in shape, the first lens element second surface is concave in shape, the second lens element first surface is concave in shape and the second lens element second surface is convex in shape.

12. The imaging module of claim 5 wherein:
    the first lens element first surface is convex in shape,
    the first lens element second surface is concave in shape,
    the second lens element first surface is concave in shape and
    the second lens element second surface is convex in shape and wherein;
    the first lens element is made of glass or plastic material, and wherein the second lens element is made of a glass or plastic material.

13. The imaging module of claim 5 wherein the first and second lens elements are shaped to conform to the prescription of the following Table 1.

* * * * *